(12) United States Patent
Sun et al.

(10) Patent No.: US 11,821,450 B2
(45) Date of Patent: Nov. 21, 2023

(54) RIVET

(71) Applicant: Penn Engineering & Manufacturing Corp., Danboro, PA (US)

(72) Inventors: Qiang Sun, Novi, MI (US); Shengbao Cai, Shanghai (CN); Yong Wu, Jiangsu (CN); Dapeng Duan, Jiangsu (CN); Xiaofei Yan, Jiangsu Province (CN)

(73) Assignee: Penn Engineering & Manufacturing Corp., Danboro, PA (US)

( * ) Notice: Subject to any disclaimer, the term of this patent is extended or adjusted under 35 U.S.C. 154(b) by 492 days.

(21) Appl. No.: 16/530,424

(22) Filed: Aug. 2, 2019

(65) Prior Publication Data

US 2020/0332818 A1 Oct. 22, 2020

(30) Foreign Application Priority Data

Apr. 16, 2019 (CN) .................................. 325739749
Apr. 16, 2019 (CN) .................................. 325739750

(51) Int. Cl.
*F16B 19/10* (2006.01)
*F16B 5/04* (2006.01)

(52) U.S. Cl.
CPC ............ *F16B 19/1027* (2013.01); *F16B 5/04* (2013.01)

(58) Field of Classification Search
CPC ........ F16B 19/06; F16B 19/086; F16B 19/10; F16B 19/1018; F16B 19/1027; F16B 5/04
See application file for complete search history.

(56) References Cited

U.S. PATENT DOCUMENTS

| | | | |
|---|---|---|---|
| 2017/0349220 A1* | 12/2017 | Yamada | F16B 19/04 |
| 2018/0266465 A1* | 9/2018 | Heger | B21J 15/025 |
| 2018/0274577 A1* | 9/2018 | Coldwell | F16B 19/086 |
| 2019/0277320 A1* | 9/2019 | Cipriano | B21J 15/025 |
| 2021/0162486 A1* | 6/2021 | Trinick | B21J 15/04 |

(Continued)

FOREIGN PATENT DOCUMENTS

EP 3031564 A1 * 6/2016 ............. B23K 11/16

OTHER PUBLICATIONS

Jim Camillo, The Simple Appeal of Self-Piercing Riveting, Assembly Magazine, published on Dec. 23, 2010, available at https://www.assemblymag.com/articles/88700-the-simple-appeal-of-self-piercing-riveting (Year: 2010).*

(Continued)

*Primary Examiner* — Kyle A Cook
(74) *Attorney, Agent, or Firm* — Gregory J. Gore, Esq.

(57) ABSTRACT

The present rivet invention has a main body comprising a first end and a second end opposite to the first end, wherein the main body further comprises a lateral wall disposed at the second end and circumferentially extending around the main body; and a core part disposed at the second end of the main body and contained inside the lateral wall of the main body, wherein the core part has an end surface for pressing against at least an end surface of one of the work pieces when the rivet is being operated to rivet the work pieces, to allow materials of the work pieces flow outwardly of the core part. An accommodation space is formed between the core part and the lateral wall to receive materials of the work pieces flowing into the space and deform outwardly at least a portion of the lateral wall of the main body.

19 Claims, 7 Drawing Sheets

(56) References Cited

U.S. PATENT DOCUMENTS

2021/0299737 A1* 9/2021 Jones .................. F16B 19/086

OTHER PUBLICATIONS

Machine Translation of EP-3031564-A1 (Year: 2016).*
Jacek Mucha et al., The Experimental Analysis of Forming and Strength of Clinch Riveting Sheet Metal Joint Made of Different Materials, Advances in Mechanical Engineering, Published Jan. 2013 (Year: 2013).*

* cited by examiner

RIVET

TECHNICAL FIELD

The present application generally relates to fastener technology, and particularly to a rivet for fastening to sheets of material together.

The present non-provisional patent application is related to Chinese patent application 325739749 filed on Apr. 16, 2019 and Chinese patent application number 325739750 filed on Apr. 16, 2019, priority from which is hereby claimed.

BACKGROUND

When a rivet is used for riveting thin plates, the riveting position is discretionary because a pre-punching on the riveted plates is not required. Furthermore, the rivet has no waste core after the riveting, and thus it is material saving, easy to operate, and highly efficient. Therefore, a tuk rivet is suitable for mass assembly line work, and is very widely applied.

Figure 1:
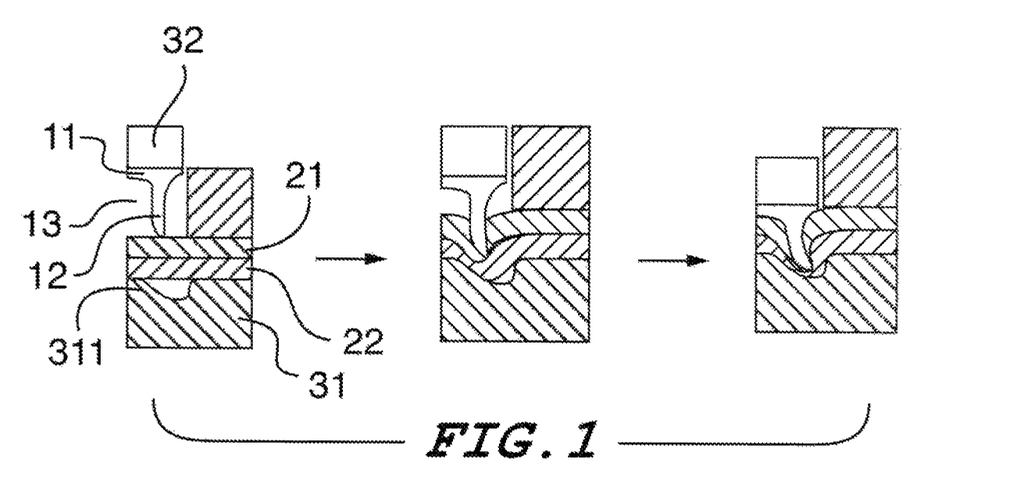
FIG. 1 depicts an installation sequence of a tuk rivet of the prior art.

FIG. 1 is a riveting schematic diagram of an existing tuk rivet. The existing rivet is generally a hollow rivet, which includes a head portion 11 and a foot portion 12 formed as a single part. The thickness of the head portion 11 is similar to that of the foot portion 12, such that an interior of the foot portion 12 forms a chamber 13 with a relatively large space for the deformed material of the plates to flow into during the riveting process. During the riveting process, under combined action from an embossment 311 in the center of a lower die 31 and an upper die 32, portions of the first work piece 21 and the second work piece 22 that correspond to the embossment 311 are deformed by pressure, and a large amount of metal at the portions of the work pieces flows into the chamber 13 of the foot portion 12. However, a lower edge of the foot portion 12 is folded outwardly under the pressing of the embossment 311 of the lower die 31 to generate a shear force on the first work piece 21, which is fractured under a relatively large tensile force and shear force. The lower edge of the foot portion 12 penetrates into the second work piece 22 through the first work piece 21 to form an interlock with the two work pieces.

In the existing riveting technology of rivet, since the rivet will penetrate through the first work piece 21 when it forms an interlocking structure with the plates, the fluid between the first work piece 21 and the second work piece 22 can flow through a gap between the rivet and the first work piece 21. Therefore, the existing tuk rivets are not suitable for the connection with the high sealing requirements such as waterproofing.

SUMMARY OF THE INVENTION

To overcome the defects of the prior art, embodiments of the present application provide a rivet for solving at least one of the problems above.

In one aspect, a rivet for operably riveting work pieces is provided. The rivet comprises: a main body comprising a first end and a second end opposite to the first end, wherein the main body further comprises a lateral wall disposed at the second end and circumferentially extending around the main body; and a core part disposed at the second end of the main body and contained inside the lateral wall of the main body, wherein the core part has an end surface for pressing against at least an end surface of one of the work pieces when the rivet is being operated to rivet the work pieces, to allow materials of the work pieces flow outwardly of the core part. An accommodation space is formed between the core part and the lateral wall of the main body. When the rivet is being operated to rivet the work pieces, the space accommodates the materials of the work pieces flowing into the space which deform outwardly at least a portion of the lateral wall of the main body.

In another aspect, a system comprising work pieces and a rivet for operatively riveting the work pieces is provided. The rivet comprises: a main body comprising a first end and a second end opposite to the first end, wherein the main body further comprises a lateral wall disposed at the second end and circumferentially extending around the main body; and a core part disposed at the second end of the main body and contained inside the lateral wall of the main body, wherein the core part has an end surface for pressing against at least an end surface of one of the work pieces when the rivet is being operated to rivet the work pieces, to allow materials of the work pieces flow outwardly of the core part. An accommodation space is formed between the core part and the lateral wall of the main body, and configured to, when the rivet is being operated to rivet the work pieces, accommodate the materials of the work pieces flowing into the space and deform outwardly at least a portion of the lateral wall of the main body.

The present embodiment has at least one of beneficial effects below:

1. During the stamping of the riveting process, due to the axial limitation of the core part, most material of the two work pieces that corresponds to the rivet can only flow outwardly of the rivet, which increases the amount of the material at the interlock portion between the rivet and the work piece to ensure that the first work piece 21 is not penetrated by the shear force from the second end of the main body. Thus, the interlocking function is realized while solving the sealing requirement, such as waterproofing, of the riveted portion.

2. When riveting with a rivet of the present invention, a flat die can be used as the mounting die. That is, the cavity of the lower die uses a simple plane and no special shape is required, which makes the structure of the mounting die simple and at the same time reduces the centering requirement between the riveting device and the mounting die (as shown in FIG. 1, the riveting device needs to be centered with the embossment of the lower die when riveting with an existing rivet).

3. The main body and the core part of the present invention can be formed separately, which can simplify the manufacture difficulty for the mold of the main body and improve the service life of the mold. Since adopting a separate structure enables the main body and the core part to be manufactured independently, the core part can be manufactured into a relatively complicated structure to enhance the interlocking ability of the rivet.

4. The main body and the core part can be formed of same or different materials, which is beneficial to save material cost. Besides, the main body and the core part can be made of aluminum, which can eliminate the electroplating process on the rivet, thereby reducing production cost. The weight of the rivet can also be greatly reduced to achieve a lightweight design.

5. The rivet of the present invention has a skirt section on the core part, so that during the riveting process of the rivet, not only the interlocking function of the core part with the first work piece is increased, but also the skirt section can further push the second end of the main body to fold outwardly, thereby enhancing the interlocking level between the second end of the main body portion and the work piece, and greatly improving the tensile resistance at the riveting point of the rivet.

For the foregoing and other objects, features, and advantages of the present invention to be more fully understood, preferred embodiments are described below in detail along with accompanying drawings.

BRIEF DESCRIPTION OF THE DRAWINGS

In order to more clearly illustrate the technical solutions in the embodiments of the present invention or the prior art, the accompanying drawings used in the embodiments or the description of the prior art will be briefly described below. Obviously, these drawings depict only a few embodiments of the contents of the present application, and other drawings can be obtained according to these drawings for those skilled in the art without any creative work.

The reference numbers for the accompanying drawings above are: 11—head portion, 12—foot portion, 13—chamber, 21—first work piece, 22—second work piece, 31—lower die, 311—embossment, 32—upper die, 33—pressing device, 4—main body, 41—first end, 42—second end, 43—accommodation space, 44—lateral wall, 5—core part, 51—end surface, 52—skirt section.

DETAILED DESCRIPTION OF THE EMBODIMENTS

The technical solutions in the embodiments of the present invention will be clearly and completely described in the following with reference to the accompanying drawings in the embodiments of the present invention. It is apparent that the described embodiments are only a part of the embodiments of the present invention, rather than all the embodiments. All the other embodiments that can be obtained by a person of ordinary skill in the art according to the embodiments of the present invention without creative work are within the protection scope of the present invention.

Figure 2A:
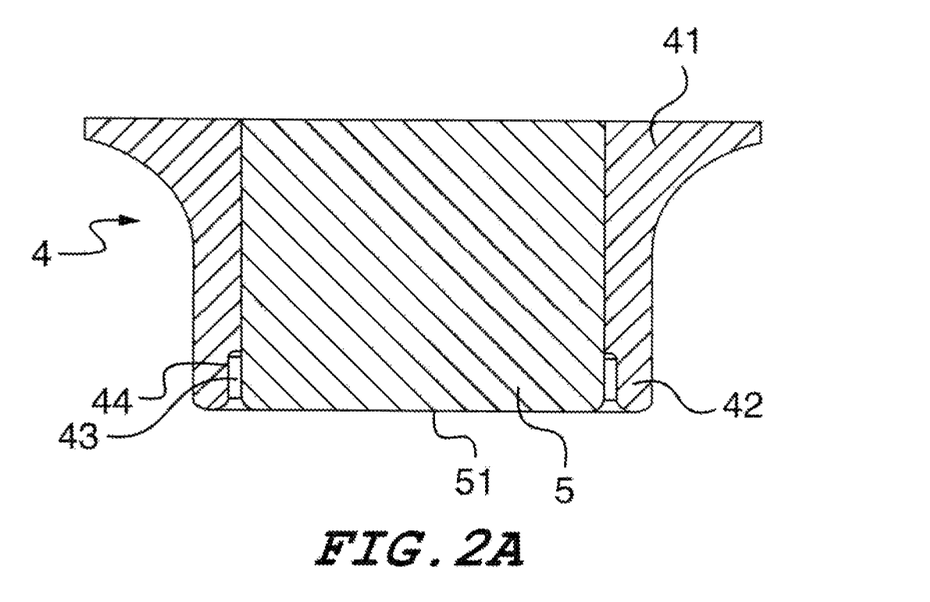
FIG. 2A is a section view of a rivet according to an embodiment of the present invention.

FIG. 2A illustrates a rivet for riveting work pieces according to the embodiment, the rivet comprises a main body 4 and a core part 5.

The main body 4 comprises a first end 41 and a second end 42 opposite to the first end 41. The main body 4 further comprises a lateral wall 44 disposed at the second end 42 and circumferentially extending around the main body 4.

The core part 5 is disposed at the second end 42 of the main body 4, wherein the core part 5 is disposed inside the second end 42 of the main body 4 and contained inside the lateral wall 44 of the main body 4.

An accommodation space 43 is formed between the core part 5 and the lateral wall 44 of the main body 4, and configured to, when the rivet is being operated to rivet the work pieces, accommodate the materials of the work pieces flowing into the space and deform outwardly at least a portion of the lateral wall 44 of the main body 4. Specifically, in the present embodiment, a least a portion of the lateral wall 44 of the main body 4 being deformed outwardly refers to that the shape of a least a portion of the lateral wall 44 of the main body 4 changes. In some other embodiments, the deforming refers to that the lateral wall 44 moves outwardly relative to the main body 4 so that the entire shape of the rivet changes.

The core part 5 has an end surface 51 for pressing against at least an end surface of one of the work pieces when the rivet is being operated to rivet the work pieces, to allow materials of the work pieces flow outwardly of the core part 5.

Figure 3A:
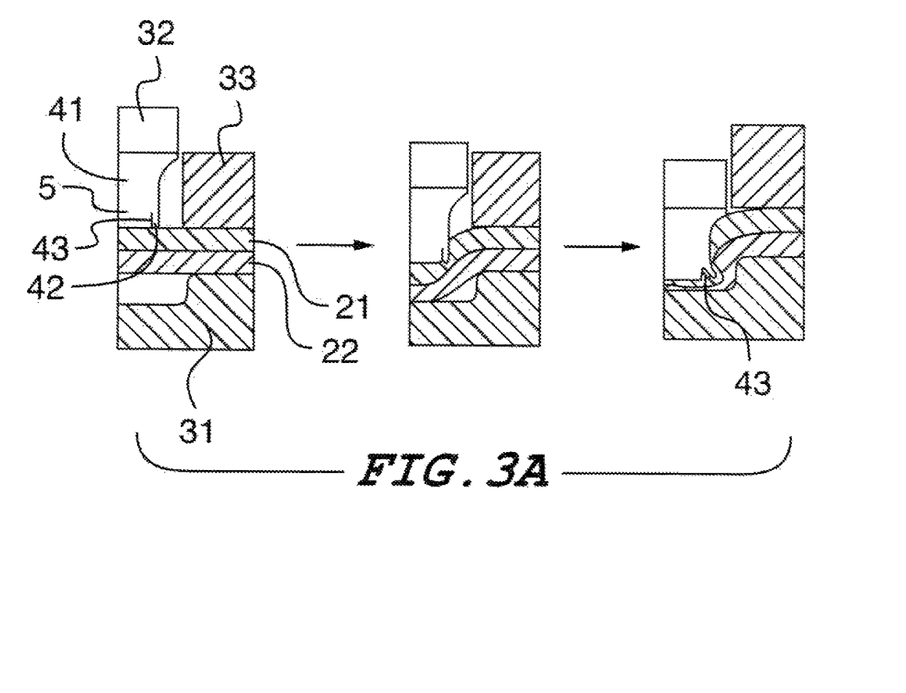
FIG. 3A depicts an installation sequence according to an embodiment of the present application.

As illustrated in FIG. 3A, during the riveting process of the rivet described in this embodiment, the first work piece 21 and the second work piece 22 to be riveted are at first pre-pressed by a pressing device 33 and the lower die 31; and then the upper die 32 is stamped downward. At this point, under the impact of the upper die 32, the end surface 51 of the core part 5 presses down the first work piece 21 and the second work piece 22, and the two work pieces are deformed. Due to the axial limitation of the core part 5, most material of the two work pieces that corresponds to the rivet can only flow outwardly of the rivet (which increases the amount of the material at the interlock position between the rivet and the work pieces so that the work piece will not be penetrated easily). A small portion of the material of the first work piece 21 flows into the accommodation space 43, and the small portion of the material in the accommodation space 43 presses the lateral wall 44 on the second end 42 of the main body 4 such that the lateral wall 44 is deformed outwardly and clips into the first work piece 21 to form an interlock. During this process, the material of the first work piece 21 is only subjected to a relatively small shear force. And the amount of material at the interlock position between the first work piece 21 and the rivet is increased such that the first work piece 21 will not fracture easily. Therefore, the rivet described in the present embodiment realizes the interlocking with the two work pieces without shearing off the first work piece 21, which satisfies both the interlocking requirement and the sealing requirement at the interlocked portion. It should be noted that the rivet described in the present embodiment is not limited to interlocking two work pieces, and multiple work pieces, such as three or four work pieces, can also be interlocked simultaneously. The material of each work piece may include steel, aluminum or plastic, and the minimum thickness of each work piece can reach 0.8 mm.

Figure 3B:
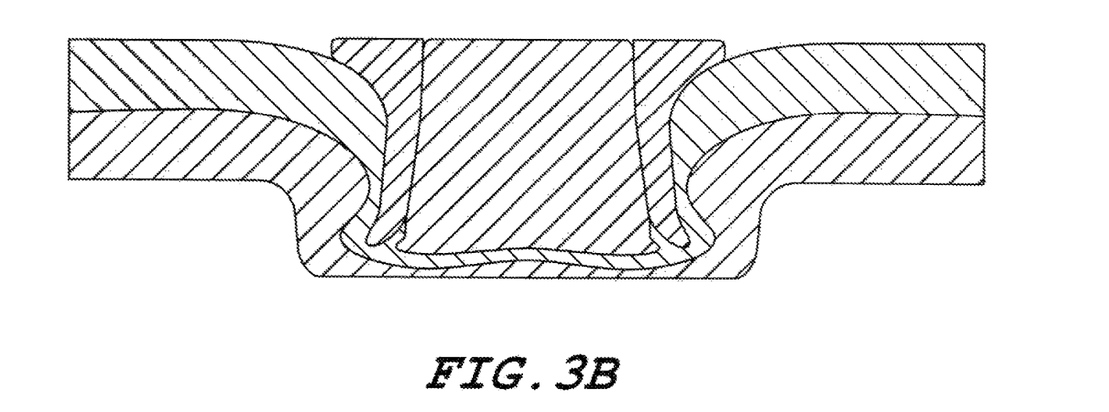
FIG. 3B is a section view of the present invention after installation.

As explained above with regard to FIG. 3A, the systematic structure of the present embodiment comprises a first work piece 21, a second work piece 22, and a rivet for operatively riveting the first and second work pieces 21, 22. After the rivet operatively rivets the two work pieces, the first work piece 21 and the second piece 22 are generally intact. In other words, the first work piece 21 and the second work piece 22 are not damaged by the riveting and are not sheared off or penetrated through by the rivet. Therefore, the systematic structure of the present embodiment has a good sealing performance. Furthermore, the systematic structure further comprises at least a third work piece (not shown). The first, second and the third work pieces are arranged in a direction from the first end 41 to the second end 42 of the main body 4. During the riveting process, the third work piece is penetrated through by the rivet, which means that a section of the third work piece riveted by the rivet is sheared off such that the third work piece is broken into two parts, while the first and second work pieces remains undamaged or is not sheared off. It can be appreciated that the number of the third work piece can be one or more, and multiple of the third work pieces are penetrated through while the first and second work pieces are not penetrated through. Such configuration ensures sealing of the systematic structure and the interlock of the work pieces by the rivet as seen in the close-up view of FIG. 3B.

With the structure described above, the rivet described in the present embodiment has the advantages as follows.

1. During the stamping of the riveting process, due to the axial limitation of the core part, most of the material of the two work pieces that corresponds to the rivet can only flow outwardly of the rivet, which increases the amount of the material at the interlock portion between the rivet and the work piece to ensure that the first work piece 21 is not penetrated by the shear force from the second end 42 of the main body 4. Thus, the interlocking function is realized while solving the sealing requirement, such as waterproofing, of the riveted portion.

2. When riveting with a rivet of the present invention, a flat die can be used as the mounting die. That is, the cavity of the lower die uses a simple plane and no special shape is required, which makes the structure of the mounting die simple and at the same time reduces the centering requirement between the riveting device and the mounting die (as shown in FIG. 1, the riveting device needs to be centered with the embossment 311 of the lower die 31 when riveting with an existing rivet).

In some embodiments, as shown in FIG. 2A, in the rivet of the present embodiment, the first end 41 of the main body 4 is substantially planar or hemispherical, and the second end 42 of the main body 4 is substantially cylindrical. A maximum outer diameter of the first end 41 of the main body portion 4 is greater than that of the second end 42 of the main body 4. The joint of the first end 41 and the second end 42 of the main body 4 is provided with a chamfer transition. The lateral wall 44 at the second end 42 of the main body 4 has a chamfer and the end surface 51 of the core part 5 also has a chamfer to prevent the rivet from shearing off the material of the first work piece 21. The shape of the core part 5 matches the shape of the space surrounded by the lateral wall 44 at the second end 42 of the main body 4. For example, the core part 5 has a substantially cylindrical outer surface at the second end 42, and correspondingly, the lateral wall 44 may have a substantially cylindrical inner surface. However, the diameter of the inner surface of the lateral wall 44 may be slightly greater than that of the outer surface of the core part 5 by 0.1 mm, for example, thereby forming a gap between the lateral wall 44 and the core part 5.

In some embodiments, as illustrated by FIG. 2A in combination with FIG. 3A, the main body 4 and the core part 5 is formed as a single part, or the main body 4 and the core part 5 are formed separately. Moreover, when the main body 4 and the core part 5 of the present invention are formed separately, the core part 5 can penetrate through the first end 41 and the second end 42 of the main body 4. That is, the core part 5 may extend from the second end 42 to the first end 41 of the main body 4. Alternatively, the core part 5 may not penetrate through the first end 41 and the second end 42 of the main body 4.

With the above embodiment, the rivet can be made in a more flexible and convenient manner. The manner of forming the main body 4 and the core part 5 separately can simplify the manufacture difficulty for the mold of the main body and improve the service life of the mold.

Figure 2B:
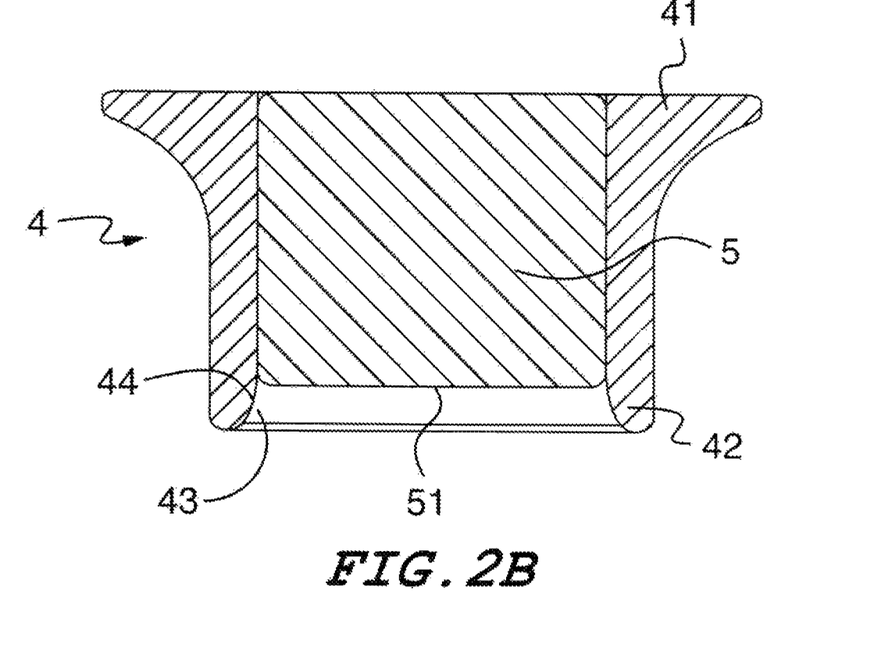
FIG. 2B is another section view of a rivet according to an embodiment of the present invention.
Figure 2C:
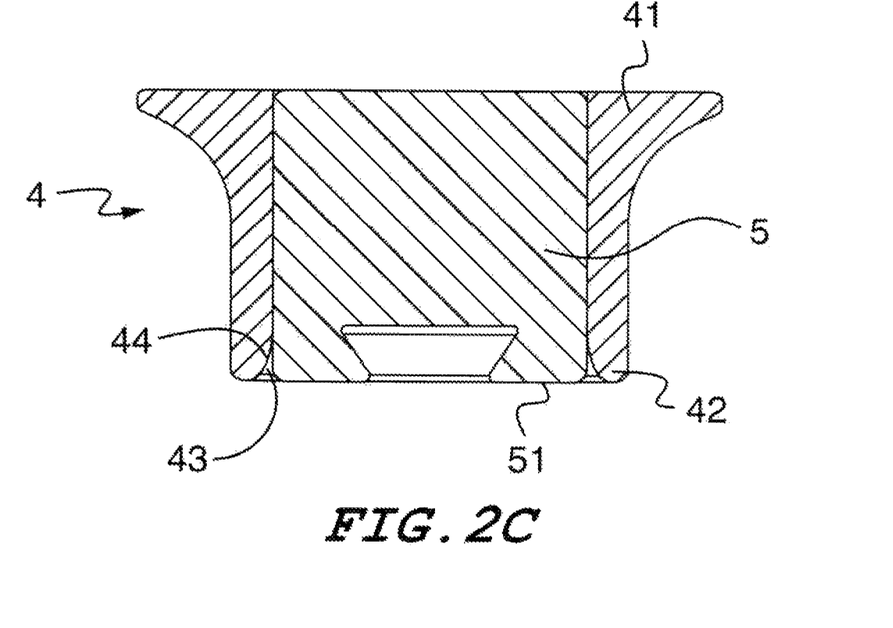
FIG. 2C is a section view of a rivet according to another embodiment of the present invention.

In some embodiments, as illustrated by FIG. 2A, the accommodation space 43 is enclosed by the lateral wall 44 at the second end 42 of the main body 4 and the outer surface of the core part 5. That is, the accommodation space comprises a gap between the lateral wall 44 and the core part 5. As shown in FIGS. 2B and 2C, in some embodiments, the end surface 51 of the core part 5 can be recessed into the main body 4, that is, the accommodation space 43 may include a recessed space (recessed into the main body 4) defined by the end surface 51 of the core part 5 and the gap between the lateral wall 44 and the core part 5. In other words, the end surface 51 of the core part 5 may protrude over the second end 42 of the main body 4, or the end surface 51 of the core part 5 may be aligned with the second end 42 of the main body 4, or the end surface 51 of the core part 5 may be recessed into the second end 42 of the main body 4. It should be ensured that in the stamping process, the end surface 51 of the core part 5 can abut against the first work piece 21 to prevent a large amount of material from flowing into the accommodation space 43 when the first work piece 21 is deformed, causing the second end 42 of the main body 4 shears off the first work piece 21.

Figure 4A:
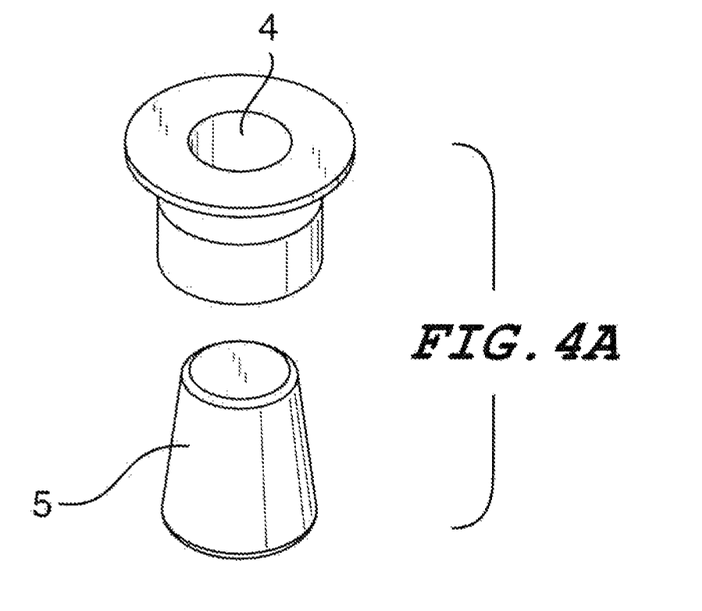
FIG. 4A is an isometric assembly view of an embodiment of the present invention.
Figure 4B:
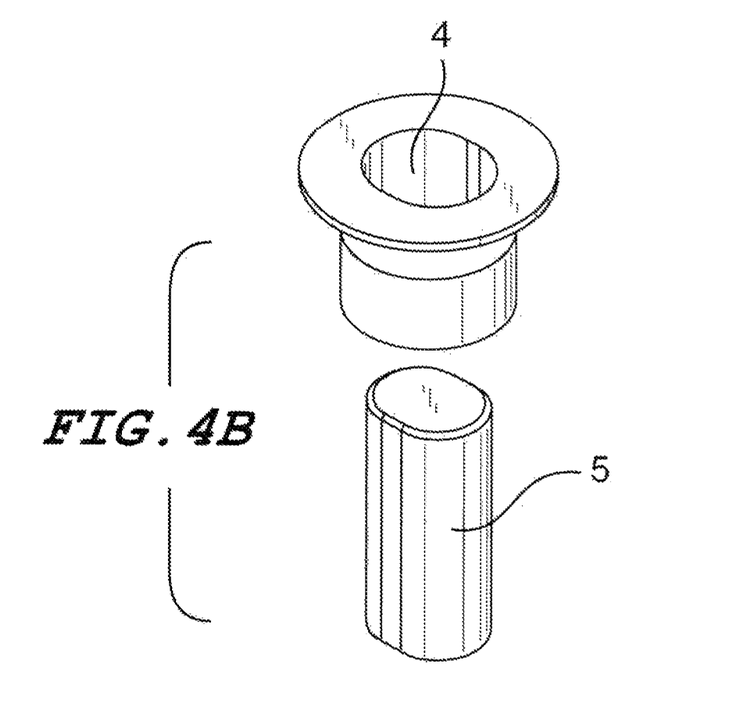
FIG. 4B is an isometric assembly view of another embodiment of the present invention.
Figure 4C:
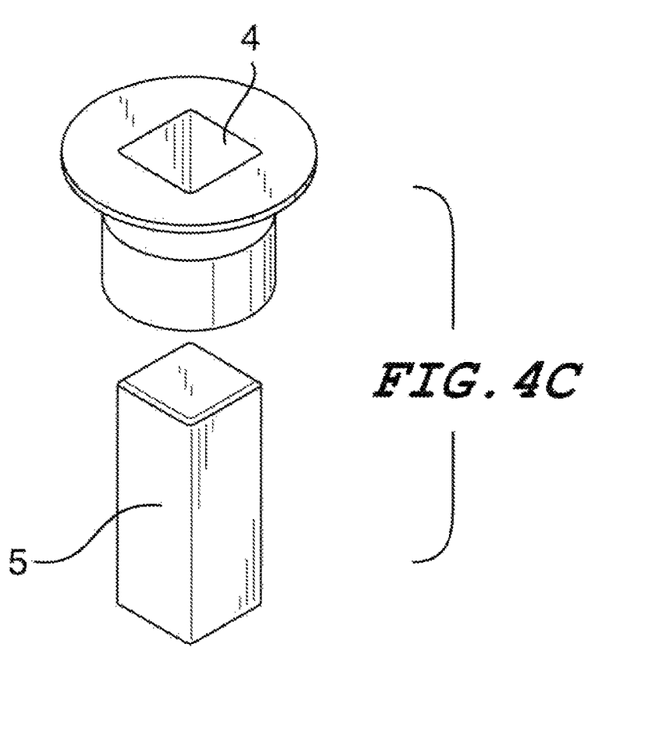
FIG. 4C is an isometric assembly view of another embodiment of the present invention.
Figure 4D:
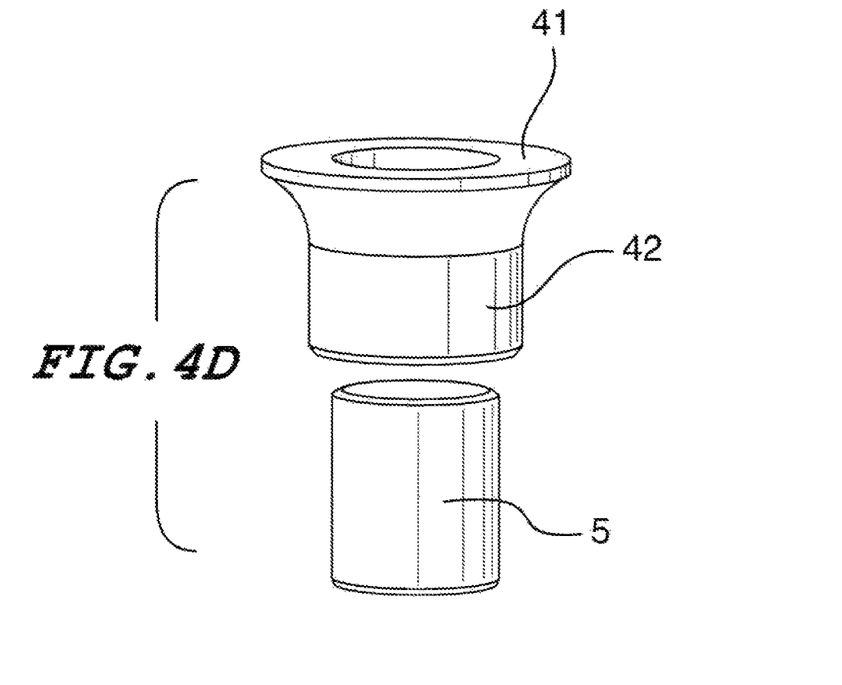
FIG. 4D is an isometric assembly view of another embodiment of the present invention.

As illustrated by FIGS. 4A-4D, in some embodiments, an outer diameter of a cross section of an end of the core part 5 facing away from the first end 41 of the main body 4 increases from the first end 41 of the main body 4 to the second end 42 of the main body 4. That is, the core part 5 has a length adjacent to its end surface, and along the length an outer diameter of the core part decreases from the end surface to the first end of the main body 4. In FIG. 4b, the outer diameter of the cross section of the core part 5 gradually decreases over the entire length of the core part 5. In some embodiments, the core part 5 has a decreasing diameter of the cross section over only part of its length.

Figure 5A:
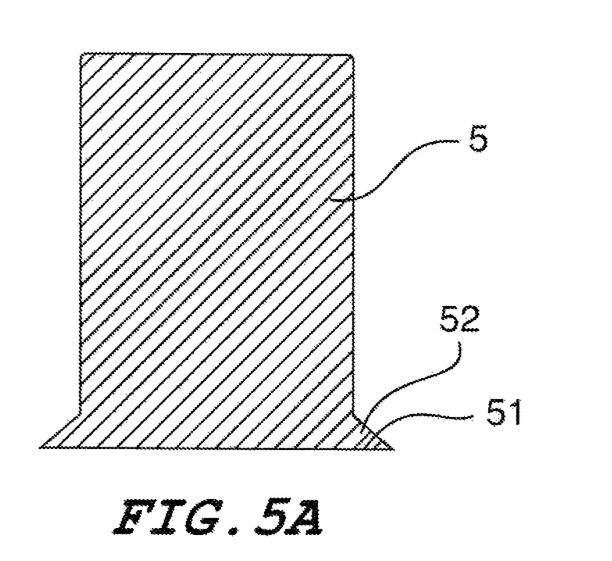
FIG. 5A is a structure diagram of a skirt section according to an embodiment of the present invention.
Figure 5B:
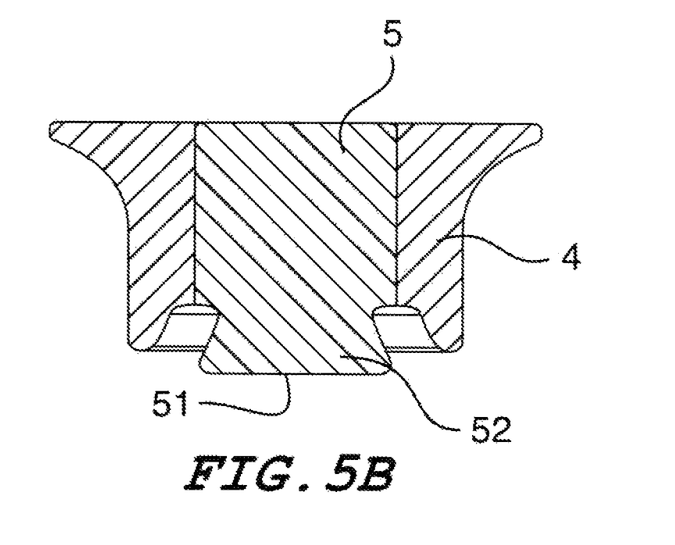
FIG. 5B is another structure diagram of a skirt section according to an embodiment of the present invention.
Figure 5C:
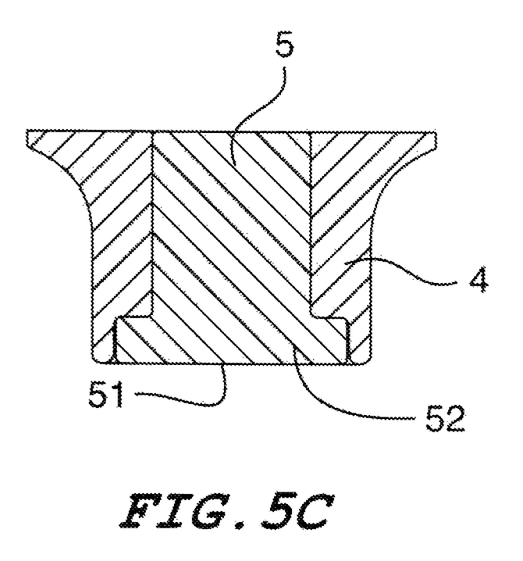
FIG. 5C is yet another structure diagram of a skirt section according to an embodiment of the present invention.

For example, as illustrated in FIGS. 5A-5C, an end of the core part 5 facing away from the first end 41 of the main body 4 has a skirt section 52 protruding from an outer surface of the core part 5 and extending axially along the core part 5. Moreover, as illustrated in FIGS. 5A and 5B, in the axial direction, the outer diameter of the cross section of the skirt section 52 gradually increases in a direction away from the first end 41 of the main body 4. That is, the skirt section 52 is substantially swallow-tailed. The swallow-tailed skirt section has a slope towards the first end 41 of the main body 4. Also, as illustrated in FIG. 5C, the skirt section 52 is a step surface protruding from the outer surface of the core part 5. In other embodiments, the skirt section 52 has a rectangular cross section, but the outer diameter of the cross section of the skirt 52 is greater than the outer diameter of the cross section of core part 5. During the riveting process, the material of the first work piece 21 flowing into the accommodation space 43 may cover and fasten the core part 5 or the skirt section 52 such that the core part 5 or the skirt section 52 forming another interlocking structure with the first work piece 21, further enhancing the interlocking ability of the rivet in accordance with the embodiment. On the other hand, the end of the core part 5 having the cross section with an increased outer diameter or the skirt section 52 can further push the second end 42 of the main body 4 to fold outwardly, thereby enhancing the interlocking level of the second end 42 of the main body 4 with the work piece, and greatly improving the tensile resistance at the riveting point of the rivet. In other words, the core part 5 is disposed with an enlarged diameter portion for forming an interlocking structure with the first work piece 21, which enhances the interlocking ability of the rivet.

In some embodiments, the inner diameter of the lateral wall of the main body increases gradually as viewed in the direction from the first end to the second end. If the outer diameter of the lateral wall 44 remains constant, the increasing inner diameter causes the thickness of the lateral wall 44 to gradually increase from the second end to the first end, which forms a wedge structure that facilitates the lateral wall 44 to be folded outwardly of the rivet and partially inserted into the first work piece 21.

In some embodiments, when the main body 4 and the core part 5 are formed separately, and the main body 4 and the core part 5 may be connected through transition fit, interference fit, threaded connection or glue connection. The transition fit includes clearance fit and interference fit. However, the amount of gap obtained by the transition fit is small, so that the core part 5 will not easily detach from the second end 42 of the main body 4 in a free state. Therefore, during the riveting process, the material of the first work piece 21 does not flow into the accommodation space 43 in a large amount, and will not cause the first work piece 21 to be sheared off by the second end 42 of the main body 4, thus will not affect the sealing of the riveting.

In some embodiments, as illustrated in FIGS. 4A to 4D, to satisfy the different interlocking needs, the lateral cross section of the core part 5 may have any shapes such as a circle, an ellipse, a rectangle, a diamond, a trapezoid, a semicircle, a triangle, or the like. That is, the core part 5 may be in any shapes such as a cylinder, a cone, an ellipsoid, a cube, or the like. Moreover, the core part 5 may have a lateral cross section with equal area in its lengthwise direction, such as a cylinder, or have a cross section with changing area in its lengthwise direction, such as a cone.

In particular, thanks to the interlocking principle of the rivet in accordance with the present embodiment (that is, the main body of the rivet does not need to penetrate through the first work piece 21, so the hardness and strength requirements of the main body of the rivet are relatively low), either or both of the main body 4 and the core part 5 can be made of any material as aluminum, cold-heading steel, stainless steel or steel alloy, and the like. The rivet made of aluminum can eliminate the electroplating process, thereby reducing production cost and greatly reducing the weight of the rivet to achieve a lightweight design. According to the material requirements of the work pieces to be riveted, the material of the main body 4 and the core part 5 in one rivet may be the same or different, so as to realize the interlocking effect while saving cost.

Specific embodiments have been used in the present invention to explain the principles and implementation of the present invention, and the description of the embodiments above only serves to help understand the main idea of the present invention. Meanwhile, a person ordinarily skilled in the art will be able to make changes to the specific implementation and the scope of application in accordance with the idea of the present invention. In all, the contents of the specification shall not be construed as limiting the scope of the invention.

What is claimed is:

1. A two-piece rivet for operably riveting work pieces together face-on-face, the rivet comprising:
    a main body;
    a core part, wherein the main body and the core part are two individual component parts;
    the main body comprising a first end and a second end opposite to the first end, wherein the main body further comprises a lateral wall disposed at the second end and circumferentially defining an inner surface of the lateral wall and the main body;
    the core part disposed at the second end of the main body and rigidly affixed to the inner surface of the lateral wall of the main body, wherein the core part has a pressing end surface configured to press against at least an end surface of one of the work pieces when the rivet is being operated to rivet the work pieces, whereby materials of the work pieces flow outwardly of the core part and interlock together without the rivet penetrating through said one of the work pieces;
    wherein an accommodation space is defined by the core part and the inner surface of the lateral wall of the main body between a portion of the core part adjacent the core part pressing end surface and the adjacent inner surface of the lateral wall, and is configured, such that when the rivet is being operated to rivet the work pieces together face-on-face the materials of said one of the work pieces flow into the accommodation space causing at least a portion of the lateral wall at the second end of the main body to deform outwardly; and
    wherein a top of the rivet comprises a substantially flat surface covering the accommodation space, the lateral wall, and the core part.

2. The rivet of claim 1, wherein the main body and the core part are formed separately.

3. The rivet of claim 1, wherein the accommodation space comprises a gap between the inner surface of the lateral wall and an outer surface of the core part.

4. The rivet of claim 1, wherein the end surface of the core part protrudes over the second end of the main body, or the end surface of the core part is aligned with the second end of the main body.

5. The rivet of claim 1, wherein the core part extends from the second end to the first end of the main body.

6. The rivet of claim 1, wherein the main body has an outer diameter at its first end greater than that at its second end.

7. The rivet of claim 1, wherein the core part has adjacent to its end surface a length where an outer diameter of the core part gradually decreases from the end surface toward the first end of the main body.

8. The rivet of claim 1, wherein the lateral wall of the main body has an increasing inner diameter from the first end to the second end.

9. The rivet of claim 1, wherein the lateral wall has a chamfered inner wall.

10. The rivet of claim 1, wherein the end surface of the core part is chamfered.

11. The rivet of claim 1, wherein the main body and the core part are formed separately, and the main body and the core part are connected through transitional fit, interference fit, threaded connection or gluing.

12. The rivet of claim 1, wherein the core part has a lateral cross section shaped as a circle, an ellipse, a diamond, a semicircle, a trapezoid, a rectangle or a triangle.

13. The rivet of claim 1, wherein the core part has a lateral cross section that changes or does not change in its lengthwise direction.

14. The rivet of claim 1, wherein either or both of the main body and the core part is made of aluminum, cold-heading steel, stainless steel or steel alloy.

15. The rivet of claim 1, wherein the core part has adjacent to its end surface a skirt section protruding from an outer surface of the core part.

16. The rivet of claim 15, wherein the skirt section has an inward_slope towards the first end of the main body.

17. The rivet of claim 15, wherein the skirt section is a step surface protruding from the outer surface of the core part.

18. A system comprising two work pieces and a two-piece rivet for operatively riveting the two work pieces together face-on-face, wherein the system comprises:
    the two work pieces; and
    the two-piece rivet, the rivet comprising:
        a main body comprising a first end and a second end opposite to the first end, wherein the main body further comprises a lateral wall disposed at the second end and circumferentially defining an inner surface of the lateral wall and the main body; and
        a core part is disposed at the second end of the main body and is rigidly affixed to the inner surface of the lateral wall of the main body, wherein the core part has an end surface configured to press against at least an end surface of one of the two work pieces when the rivet is being operated thereby causing materials of the work pieces to flow outwardly of the core part;
    wherein an accommodation space adjacent the end surface of the core part, and defined between the core part and the lateral wall of the main body, is configured such that, when the rivet is being operated to rivet the work pieces together face-on-face the materials of the work pieces flow thereinto and deform outwardly at least a portion of the lateral wall at the second end of the main body whereby the work pieces are joined by the interlocking deformation of the work pieces without the rivet penetrating through said one of the two work pieces; and
    wherein a top of the rivet comprises a substantially flat surface covering the accommodation space, the lateral wall, and the core part.

19. The system of claim 18, wherein the work pieces comprises two or more work pieces arranged face-on-face in a direction from the first end to the second end of the main body, and a first of the work pieces closest to the second end is not penetrated through by the rivet after the work pieces are riveted together by the rivet.

\* \* \* \* \*